(12) United States Patent
Mayer et al.

(10) Patent No.: US 11,106,270 B2
(45) Date of Patent: Aug. 31, 2021

(54) PARALLEL/SERIAL OPERATIONAL SEQUENCING

(71) Applicant: Hewlett-Packard Development Company, L.P., Spring, TX (US)

(72) Inventors: Brian C Mayer, Boise, ID (US); Mark Hirst, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 170 days.

(21) Appl. No.: 16/462,725

(22) PCT Filed: Jan. 31, 2017

(86) PCT No.: PCT/US2017/015891
§ 371 (c)(1),
(2) Date: May 21, 2019

(87) PCT Pub. No.: WO2018/143955
PCT Pub. Date: Aug. 9, 2018

(65) Prior Publication Data
US 2019/0369709 A1     Dec. 5, 2019

(51) Int. Cl.
| | |
|---|---|
| G06F 1/32 | (2019.01) |
| G06F 1/3234 | (2019.01) |
| H04N 1/00 | (2006.01) |
| G06F 1/3209 | (2019.01) |
| G06F 1/3228 | (2019.01) |

(Continued)

(52) U.S. Cl.
CPC ......... *G06F 1/3284* (2013.01); *G06F 1/3206* (2013.01); *G06F 1/3209* (2013.01); *G06F 1/3228* (2013.01); *G06F 1/3234* (2013.01);

*H04N 1/00* (2013.01); *H04N 1/00896* (2013.01); *H04N 1/00904* (2013.01); *G06F 1/32* (2013.01); *G06F 1/329* (2013.01);

(Continued)

(58) Field of Classification Search
None
See application file for complete search history.

(56) References Cited

U.S. PATENT DOCUMENTS

| | | | |
|---|---|---|---|
| 5,122,816 | A | 6/1992 | Poeppel et al. |
| 6,799,004 | B2 | 9/2004 | Richtsmeier et al. |

(Continued)

FOREIGN PATENT DOCUMENTS

JP          2012128261          7/2012

*Primary Examiner* — Tanh Q Nguyen
(74) *Attorney, Agent, or Firm* — HP Inc. Patent Department

(57) ABSTRACT

In one example, a printer with parallel/serial operational sequencing includes an engine control unit and an image processor unit each coupled to a set of sub-systems. A network unit is coupled to the image processor unit to monitor network packets while the engine control unit, the set of sub-systems, and the image processor unit are in sleep states. When a first predetermined packet is received, the network unit signals with a first modulation signal that the image processor unit is to awaken first before the image processor unit determines whether to awaken the engine control unit and any of the set of sub-systems. When a second predetermined packet is received, the network unit signals with a second modulation signal that the image processor unit, the engine control unit, and a portion of the set of sub-systems are to awaken at the same time.

12 Claims, 7 Drawing Sheets

(51) Int. Cl.
*G06F 1/3206* (2019.01)
*G06F 1/3293* (2019.01)
*G06F 1/3215* (2019.01)
*G06F 1/329* (2019.01)
*G06F 1/3287* (2019.01)

(52) U.S. Cl.
CPC .......... *G06F 1/3215* (2013.01); *G06F 1/3287* (2013.01); *G06F 1/3293* (2013.01); *Y02D 10/00* (2018.01)

(56) References Cited

U.S. PATENT DOCUMENTS

| | | |
|---|---|---|
| 8,633,612 B2 | 1/2014 | Bodnar et al. |
| 9,430,176 B2 | 8/2016 | Shinagawa et al. |
| 10,069,990 B2* | 9/2018 | Yamada ............ H04N 1/00891 |
| 10,455,103 B2* | 10/2019 | Hikichi ............. G03G 15/5004 |
| 2004/0264396 A1 | 12/2004 | Ginzburg et al. |
| 2010/0083020 A1* | 4/2010 | Suzuki ................. G06F 1/3293 713/322 |
| 2011/0213992 A1 | 9/2011 | Satsangi et al. |
| 2017/0149991 A1* | 5/2017 | Okazawa ............ G06F 1/3293 |
| 2018/0031670 A1* | 2/2018 | Fukushima ............ H05K 1/02 |
| 2018/0159999 A1* | 6/2018 | Ito ..................... H04N 1/33323 |
| 2019/0369709 A1* | 12/2019 | Mayer ............... H04N 1/00904 |

* cited by examiner

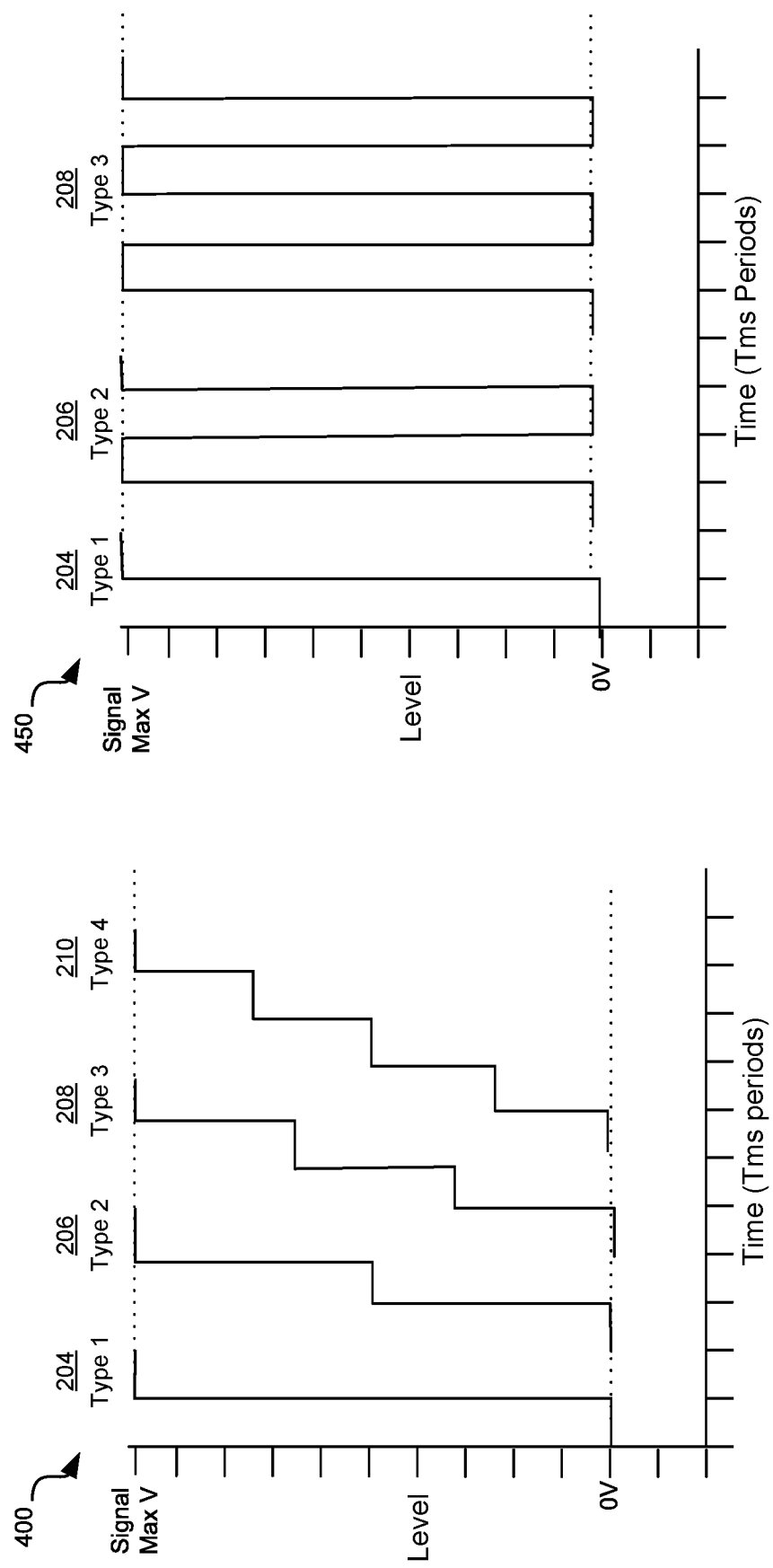

PARALLEL/SERIAL OPERATIONAL SEQUENCING

BACKGROUND

Printing devices tend to be left on in a continued powered state so that they are readily available, particularly when they are connected to networks and remotely accessed. This policy has led to increased power bills and unnecessary energy consumption. To help alleviate this wasted form of energy, printers have been developed that implement sleep states similarly to personal computers, such as suspend, deep suspend, etc. However, once printers are put into various sleep states, it may take an appreciable amount of time before the printer is woken back into a full operational state once a user decides to initiate an action. Unwanted noise may also be created as motors, solenoids, doors, flippers, and rollers are initialized.

Further, printers have been incorporating many additional features beyond just printing, such as scanning, faxing, copying, stapling, etc. and delays in performing these other tasks and printing may cause users frustration as they have grown accustomed to the ready availability of continually powered printer devices. Accordingly, a tension exists between saving power and meeting user expectations.

BRIEF DESCRIPTION OF THE DRAWINGS

This disclosure is best understood while referring to the following drawings. The elements of the drawings are not necessarily to scale relative to each other. Rather, emphasis has instead been placed upon clearly illustrating the claimed subject matter. Furthermore, like reference numerals designate corresponding similar, though perhaps not identical, components through the several views. For the sake of brevity, reference numerals or features having a previously described function may or may not be described in connection with other drawings in which they appear.

FIG. 4A is a chart illustrating example analog stair-step modulations which may be used to communicate a user initiated action;

FIG. 4B is a chart illustrating alternative digital pulse modulations which may be used to communicate a user initiated action;

DETAILED DESCRIPTION

Figure 1A:
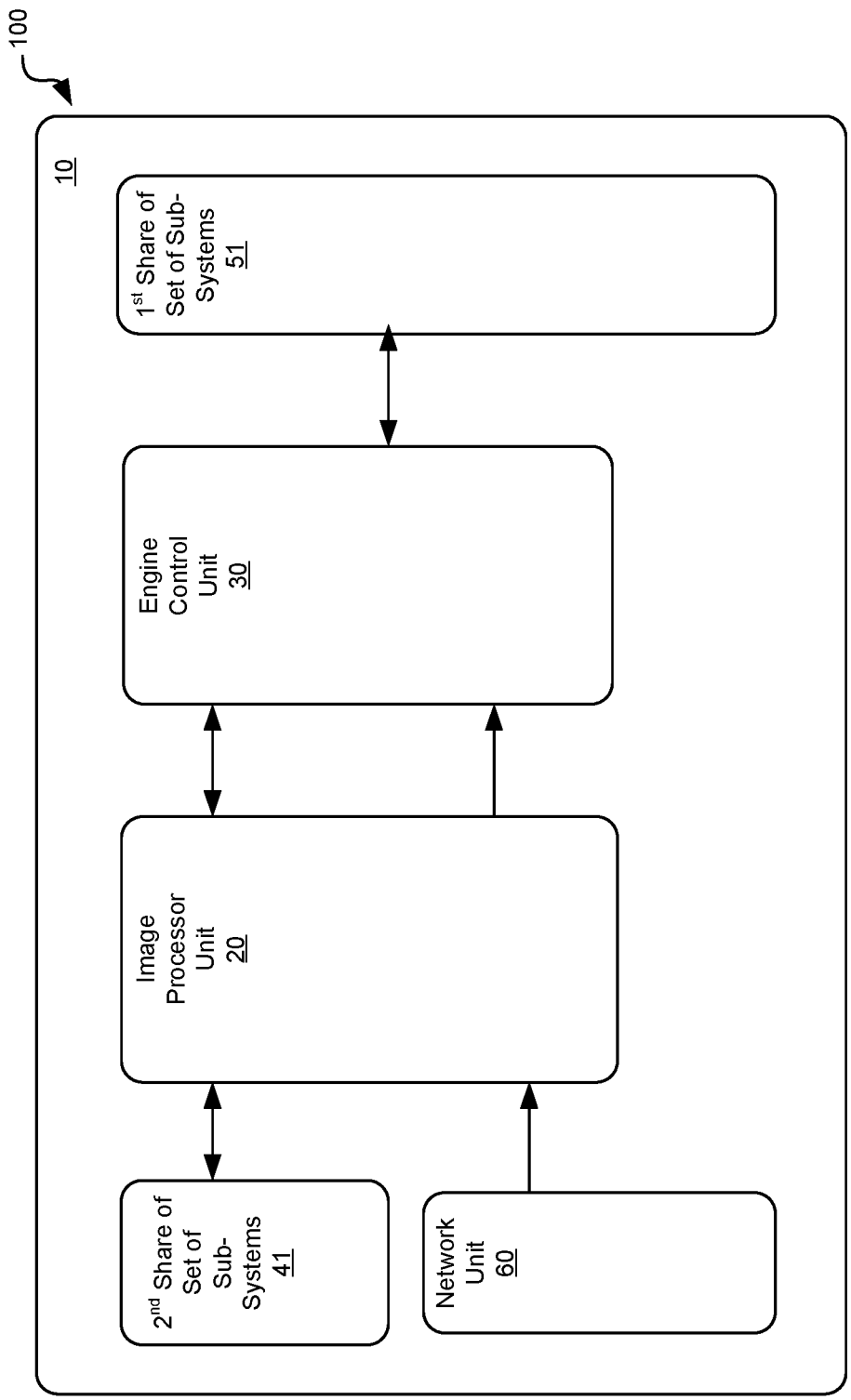
FIG. 1A is a block diagram of an example printer incorporating parallel/serial operational sequencing.

To achieve both power savings and meet user expectations when printing, the described parallel/serial operational sequencing techniques reduce the resume from suspend first page out time (sFPOT) from a suspended or deep suspend state. When there are predetermined user initiated actions detected, including identifiable network packets, that indicate a fast wake-up is expected, the printer is notified using one of multiple signal modulations. These signal modulations encode predetermined wake-up sequences for which the printer awakens appropriate sub-systems in a parallel rather than a serial cascade approach. However, when a fast wake-up is not expected or necessary, one or more signal modulations may be used to awaken the printer using the cascading serial approach. The serial approach allows a controller in the printer to examine user actions and/or received network packets to first determine how best to optimize power reduction and noise abatement by awakening predetermined appropriate sub-systems in serial.

One benefit of this parallel/serial operational sequencing is that for printing-type operations, the time for resume from suspend first page out time (sFPOT) is reduced to almost to that as if the printer were not in a sleep state. That is, a time for a resume from suspend first page out time (sFPOT) may be reduced substantially to that of a first page out time (FPOT) when the printer is not in a sleep state, substantially being about ¼ of a second (250 ms) or less depending on various printer system implementations. Accordingly, both expected printer performance and power savings due to sleep modes can be attained. These parallel/serial techniques can be extended to other multi-function printer functions to allow different types of user actions and/or network packets to optimize operational sequencing for non-printing operations. For instance, if an 'initiate digital sender' operation-type packet is received, a scanner and its media input sub-system may be powered without powering a print engine using a parallel rather than serial cascade approach. More detail of example printer and methods are described in the discussion which follows below.

In one example, an energy efficient printer may include a hardware/firmware/software (HW/FW/SW) architecture that allows the printer to stay in a deep suspend state while idle, and yet still wake from predetermined events to be able to quickly resume multi-function jobs on demand. These features are often referred to as Auto-on/Auto-off, or AOAO for short. This HW/FW/SW architecture may allow single and multifunction printers to automatically transition to consuming less than one watt of power (an industry-accepted definition for "off", also referred to herein as a "deep suspend mode") when idle, yet still wake on demand from all predetermined events that effects the usability of the device using either a parallel or serial operational sequencing depending on the type of event. The internal state of the printer is preserved when in a deep suspend state and this preservation allows the printer to wake extremely fast for parallel operational sequencing. This preservation is important in minimizing sFPOT to substantially the typical FPOT time and avoiding network timeouts from drivers and hosts when sending jobs to a printer that is asleep or when using other non-printing functions. In one example, a printer can enter a less than one watt "off" state, but still can wake from various user or network initiated actions, including network print jobs, control panel interactions, scanner I/O, engine and scanner mechanical activity (e.g., door, trays, lids), and real time clock timers.

FIG. 1A is a block diagram 100 of an example printer 10 that incorporates parallel/serial operational sequencing to increase performance, specifically a reduced sFPOT time, as well as optimizing power savings. For instance, printer 10 includes and an engine control unit 30 coupled to a first share of a set of sub-systems 51 and an image processor unit 20 that is coupled to a second share of the set of sub-systems 41 and the engine control unit 30. The printer 10 also includes a network unit 60 coupled to the image processor unit to monitor network packets while the engine control unit 30, the set of sub-systems 41, 51, and the image processor unit 20 are each in a sleep state. When a first packet is received, the network unit 60 signals with a first modulation signal that the image processor unit 20 is to awaken first before the image processor unit 20 determines whether to awaken the engine control unit 30 and any of the set of sub-systems 41, 51. Also, when a second packet is received, the network unit 60 signals with a second modulation signal that the image processor unit 20, the engine control unit 30, and a portion of the set of sub-systems 41, 51 are to awaken at the same time.

Figure 1B:
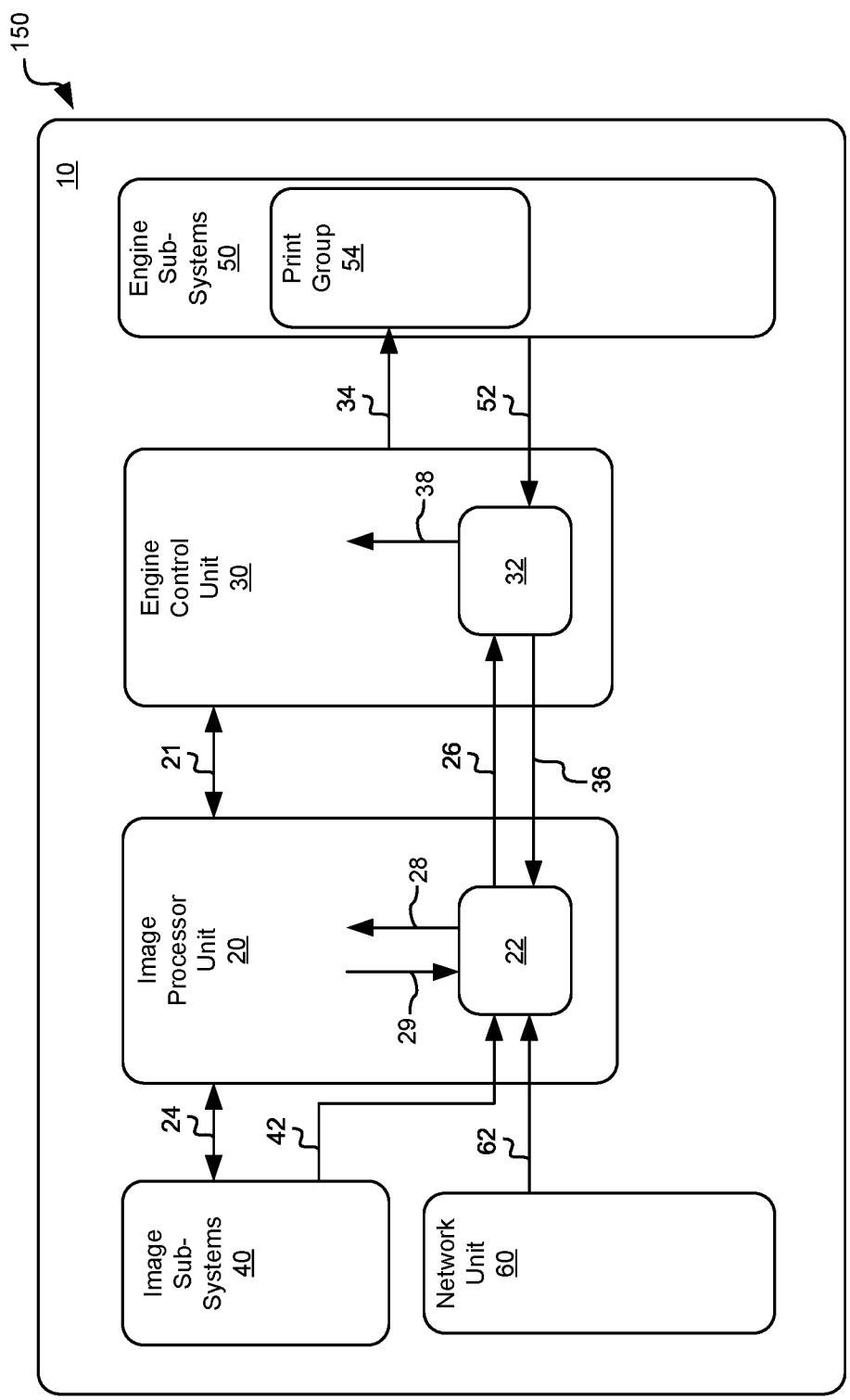
FIG. 1B is a block diagram of the example printer of FIG. 1A with more detail of an example wake-up technique.

FIG. 1B is a block diagram 150 of the example printer 10 incorporating parallel/serial operational sequencing in FIG. 1A with more detail of an example wake-up technique. The printer 10 includes an image processor unit 20 coupled an engine control unit 30. The image processor unit 20 receives image data and converts it into a format for the engine control unit 30 that controls the physical transfer of images to a print engine within a print group 54. The printer 10 may have various types of sub-systems 41, 51 to perform the functions of printer 10. The sub-systems 41, 51 may be distributed into image controlled sub-systems 40 and engine controlled sub-systems 50. Although network unit 60 is typically a stand-alone sub-system, in some examples it may be incorporated into other sub-systems 41, 51.

For the purposes of this application, "media" is meant to encompass all physical media that may be acted upon by a printer and includes, paper, vellum, plastic, etc., whether virgin or fully or partially recycled. The term "software" includes multiple types of coding including firmware, BIOS, operating systems, sub-routines, modules, state machine coding, micro-code, and programmable ASIC coding used in a HW/FW/SW architecture. The term "network" includes multiple forms of shared communication including Ethernet, Internet, intra-nets, Bluetooth, Wi-Fi, cellular network protocols, AC power wired networks, and the like. A "portion" of a set of items may include one or more of items and may include all items of the set of items.

For instance, image sub-systems 40 may include one or more of control panels, keyboards, touch-screens, scanners, scanner media handlers, fax devices, phone interfaces, and network sub-systems such a wired or optical local area networks (LANs), wireless networks such as Wi-Fi, Bluetooth, LTE, etc. Each of the imaging sub-systems may be designed to powered on/off by the image processor unit 20 or they may be designed to be continually powered and commanded from operating to various sleep states by the image processor unit 20. In particular, the network unit 60 sub-system may be designed with its own processor and memory to remain in a sleep state but the network interface still operational to monitor network traffic to wait for special "magic packets" or other packet types to arrive that can alert the image processor unit 20 to awake.

In one example, the network unit 60 incorporates the following functionality across the overall HW/FW/SW system design: (1) Network Protocol Proxy—Low power Ethernet MAC/PHY contains processor that supports selected network protocols that require frequent responses while the system is in the lowest power state; (2) Network Packet Wake Filtering—Ethernet MAC/PHY provides programmable, extended wake filter engine allowing firmware to load packet filter criteria and produce wake signal events for all necessary classes of Ethernet packets; and (3) Energy Efficient Ethernet—Support of IEEE 802.3az standard implements low-power idle modes when connection is established with an enabled link partner.

The network unit 60 is coupled to image wake monitor 22, a custom micro-controller in one example, that remains powered and wakes the image controller unit 20 on demand, and provides for additional signaling such that the system can not only wake from predetermined network packets, but also user initiated activity such as accessing a control panel, doors, trays, a scanner, and facsimile (FAX) activity. The image processor unit 20 and engine control unit 30 and other sub-systems may allow for suspend to RAM. Suspend to RAM may be a custom firmware implementation of suspend-to-RAM with support to shutdown specific HW and ASICs. The printer 10 may also include power supply efficiency enhancements and user interfaces (U Is) that allow users to control their energy usage for an individual printer or a fleet of printers.

Accordingly, a printer 10 in one example may present a UI on a control panel 216 (FIG. 2) that allows a user to select "how green" they want the printer 10 to be and network or user actions they wish to wake from and "how much performance" they require. The UI may also allow the user to control when the printer 10 will transition into an auto-off mode such as using an inactivity timer or at certain times during the day. The printer 10 may perform the following options: (1) Turn off automatically into a deep suspend state where the printer 10 consumes less than one watt; (2) Turn on automatically from any predetermined network or user actions including predetermined network packets monitored by network unit 60; (3) While in the deep suspend state, the printer 10 may wake-up based on a user-configurable set of auto-on events; and (4) Allow a user to set an auto-off delay time to cause the printer 10 to automatically enter a deep suspend state based on non-activity for the specified time.

Examples of engine sub-systems 50 include one or more print engines in print group 54, such as laser, ink-jet, wax-based, or other known printing technologies. A laser-based print engine may include a laser with a scanning optical system for scanning a print drum to charge it to pick up toner particles, a media movement system to pass physical media pass the drum to transfer the toner particles to the physical media, and a print engine with a fuser to heat and fuse the toner particles on the physical media. An ink-jet based print engine may include multiple page-wide or scanning printheads used to place drop-on-demand ink or other fluids.

Also, the print group 54 may include one or more physical media supply media input units to transfer one or more types of physical media in one or multiple trays to the media movement system. The print group 54 may also include a media output unit to receive the physical media from the media movement system once printing is complete. The media output unit may include multiple output trays, a sorter to direct the physical media to the appropriate tray, a stapler to bind multiple physical media of a print job, and a duplexer to allow for double-sided printing of the physical media. The duplexer may include, or it may be provided separately, a flipper to reverse the top direction of the media to allow the double-sided printing and/or to provide the printout to be face-up or face-down depending on user configurations. The media input and the media output sub-systems may include their own processors for controlling their own operations. The printer 10 may also include a power supply to provide one or more voltages, currents, and/or power to the various subsystems 40, 50, media input unit, media output unit, image processor unit 20, and engine control unit 30.

The image processor unit 20 may include an image wake monitor 22 to receive wake-up signals, such as sub-system wake-up 42, engine control unit wake-up 29, engine wake image 36, and network wake-up 62. Each of these wake-up signals in this example may be modulated with one or more patterns to allow the wake monitor 22 to determine if a predetermined parallel operational sequence or a standard serial operational sequence is to be initiated. The image wake monitor 22 may include one or more outputs such as image wake 28 to wake up the image processor unit 20 and engine wake 26 to wake up the engine control unit 30. The image sub-systems 40 may communicate with image processor unit 20 using a first communication interface 24.

The engine control unit 30 may have its own engine wakeup monitor 32 which can receive one or more wake up signals such as engine sub-system wake-up 52. The engine wake-up monitor 32 may have one or more outputs such as an engine wake image 36 coupled to image wake monitor 22 and engine wake 38 for the engine control unit 30. The engine control unit 30 and the image processor unit 20 may communicate with each other using a second communication interface 21. The engine control unit 30 may awaken a print group 54 that includes a print engine and media handling devices.

Accordingly, a printing device such as printer 10 may include parallel/serial operational sequencing. The printer 10 may include an engine control unit 30 to a first share (engine sub-systems 50) of a set of sub-systems and an image processor unit 20 coupled the engine control unit 30 and to a second share (image sub-systems 40) of the set of sub-systems and the engine control unit. A network unit 60 is coupled to the image processor unit 20 to monitor network packets while the engine control unit 30, the set of image sub-systems 40 and engine sub-systems 50, and the image processor unit 20 are each in a sleep state. When a predetermined packet is received, the network unit 60 signals with a first modulation signal (on network wake-up 62) that the image processor unit 20, the engine control unit 30, and a portion of the set of sub-systems 40, 50 are to wake at the same time. When the network unit 60 determines that a network packet need further examining, the network unit 60 signals with a second modulation signal (on network wake-up 62) the image processor unit 20 to wake first before the image processor unit 20 determines whether or not to wake the engine control unit 30 and any of the set of sub-systems 40, 50.

Figure 2:
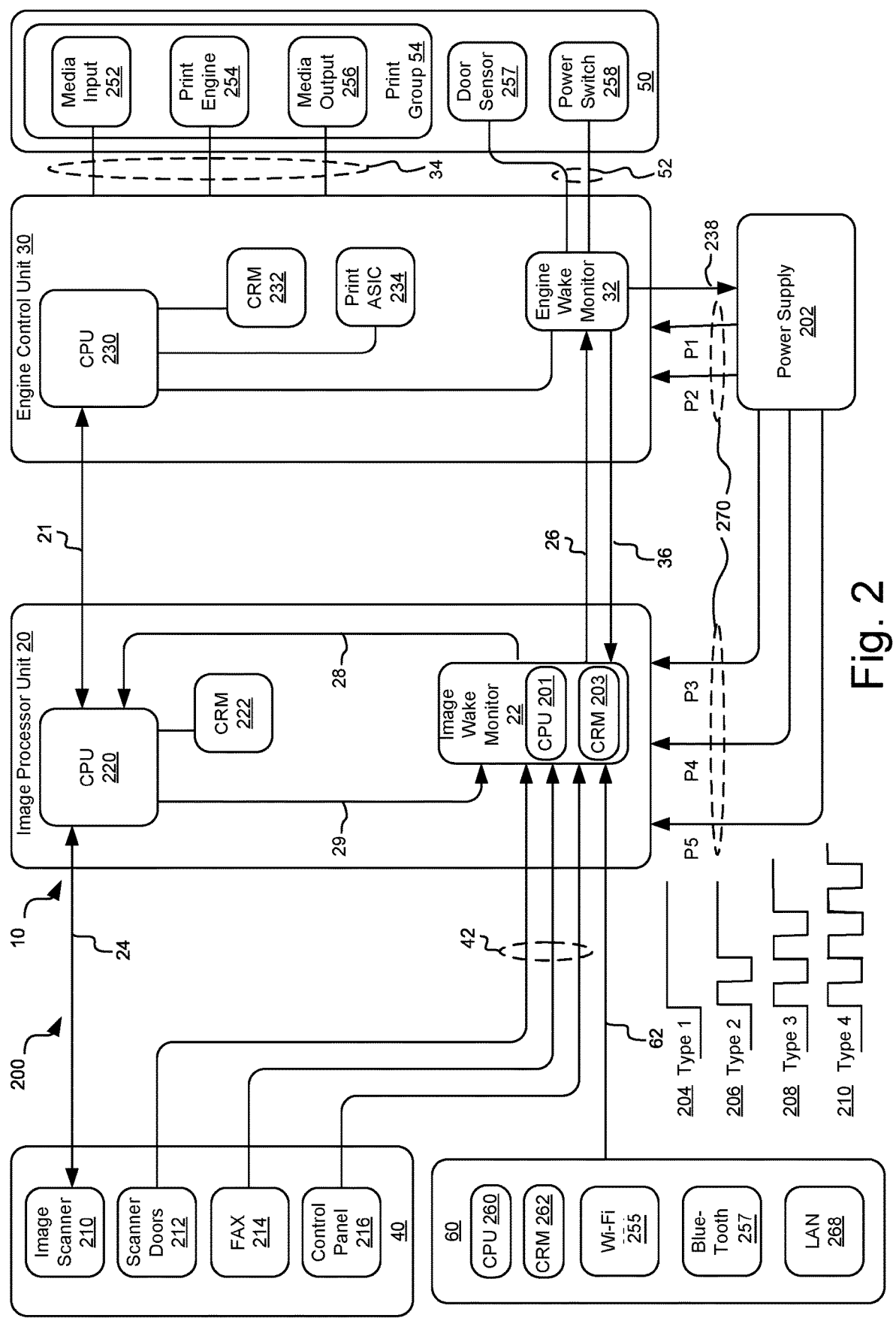
FIG. 2 is a more detailed block diagram of the example printer incorporating parallel/serial operational sequencing.

FIG. 2 is a more detailed block diagram 200 of example printer 10 incorporating parallel/serial operational sequencing. In this example, the image sub-systems 40 include an image scanner 210, scanner doors 212, a FAX interface 214, a control panel 216, and possibly other sub-systems. The network subsystem 60 may include its own processor CPU 260 and computer readable memory 262 to allow it to operate independently during the suspension of image processor unit 20. The network sub-system 60 may have one or more communication interfaces including a Wi-Fi module 255, a Bluetooth module 257, and a LAN module 268. Each of the modules may be implemented as independent units with their own logic and magic packet protocols or they may be under the control of CPU 260 and CRM 262 and any wake-up signals may be combined into a single network wake-up 62 signal that is modulated to indicate the type of parallel or serial wake-up for the printer 10. Each of the other image sub-systems 40 may include one of a set of sub-system wake-up signals 42 that may be modulated to wake up the image processor unit 20 by image wake monitor 22. Image wake monitor 22 in this example has its own processor and memory, respectively CPU 201 and CRM 203, for independent operation during deep suspend of image processor unit 20. In other examples, the wake monitor 22 may be implemented with fixed logic, state machines, micro-controllers, and the like.

The image scanner 210 is coupled with first communication interface 24 to image processor unit 20 to allow for conversion of the scanned image, either for sending to engine control unit 30 for printing, to FAX interface 214, or network sub-system 60 for storage on networked devices. The power of image scanner 210 may be under the control of image sub-system 40 or it may be under the control of engine control unit 30 depending how a printing system is architected.

The engine sub-systems 50 may include a print group 54 having a print engine 254, and media input unit 252 and media output unit 256, which the latter two form a media delivery system to move physical media into and out of the print engine 254. Further, one or more door sensors 257 coupled to the engine wake monitor 32 may be part of the media delivery system to allow the engine control unit 30 to awaken when a user attempts to access the media delivery area, such as to load new media, exchange media, correct media jams and media feeding errors. Also, a main power switch 258 may also be coupled to the engine wake monitor 32 (or alternatively image wake monitor 22) to allow for powering up of the printer 10.

The engine wake monitor 32 may be implemented as a standalone processor and memory as with the image wake monitor 22 or it may be implemented as hard coded logic or state machines depending on the complexity required for a particular printer design. The engine wake monitor 32, in this example, supplies a power enable signal 238 to a printer power supply 202 which supplies various voltages, currents, and power the sub-systems 40, 50 and the image processor 20 and engine control unit 30.

For example, the printer power supply 202 may supply a number of different voltages and power on power signals 270, P1-P5. In this example, the power supply 202 may supply a +5V supply on power signal P1 for the CPU 230, CRM 232, print ASIC 234 and analog circuitry 236 during normal operation and a lower +3.3V during a suspend or deep suspend mode. To provide sufficient power for the print engine 254 as well as the motors in the media delivery sub-systems, media input unit 252 and media output unit 256, the power supply 202 provides a +24 V on power signal P2 to the engine control unit 30 during normal operation but may shut off the +24V signal during a suspend or deep suspend mode. The power supply 202 may supply the image processor unit with additional power signals, such as +5V on power signal P3 for the CPU 220 and a +3.3V on power signal P4 for CRM 222, and a +24V for the image scanner 210. Depending on any particular printer design, the number of various voltages may be more or less and the values of the voltages may be more or less.

Each of the set of sub-system wake-up signals 42 and network wake-up 62 signals may modulate their respective signals with a modulation that indicates the type of wake-up. For instance, the modulation may be a digital pulse modulation as shown in FIG. 2 for modulation types 1-4, respectively 204, 206, 208, and 210. The type 1 204 modulation has one leading edge, the type 2 206 modulation has two leading edges, the type 3 208 modulation has three leading edges, and the type 4 210 has four leading edges in this example. Accordingly, image wake monitor 22 may count the number of leading edges within a set time period from the first edge to determine the type of wake-up desired. For instance, in this example, the following pre-determined Table 1 may be used to associate the type of wake-up signal to the respective parallel or serial operational sequencing desired.

TABLE 1

Types of Modulation for Operational Sequencing

| Type | Parallel/Serial | Comments |
| --- | --- | --- |
| Type 1 | Serial - Packet to be scanned to determine which components to wake | Wake Image Processor Unit 20 first, examiner network packet information, then if required by network packets received, Control Engine unit 30, then once Control Engine Unit 30 fully operational, wake Print Engine 254 |
| Type 2 | Parallel - wake all sub-systems | Wake Image Processor Unit 20, Control Engine Unit 30, Print Engine, Scanner 210, Media input unit 252, and Media output unit 256 at same time |
| Type 3 | Parallel - Scanner only for Digital Sender Operation | Wake Image Processor Unit 20 and Scanner 210 both at same time without waking the Engine Control unit 30 and Print Engine 54 |
| Type 4 | Parallel - Printer Management Inspection | Wake Image Processor Unit 20 and Engine Control Unit 30 at same time without waking the Print Engine 254 |

When wake monitor 22 receives a type of wake-up, the CPU 220 and CRM 222 of image processor unit 20 are awaken with the image wake signal 28 to bring the image processor unit out of deep suspend or suspend states. When the wake monitor 22 determines that a type of modulation received is to perform a parallel wake with the engine control unit 30, then the wake monitor 22 sends the engine wake signal 26 to the engine wake monitor 32 to wake the CPU 230, CRM 232, and a print ASIC 234 of the engine control unit 30. When the wake monitor 22 determines that a type of modulation received is to perform a serial wake, the wake monitor 22 signals CPU 220 of the image processor unit 20 to wake with image wake signal 28. In one example, the engine control unit 30 and the image processor unit 20 may wake each other from a sleep state to an operational state and the first modulation may be passed through the image processor unit 20 to the engine control unit 30 to allow it to also know the type of wake-up. Alternatively, the image processor unit 20 may communicate the type of wake-up using the second communication interface 21. The CPU 220 then inspects the contents of the received network packets from network unit 60 or the states of other wake event devices to determine what appropriate sub-systems should be awaken. If the image processor unit 20 determines that the engine control unit 30 should be awaken, then the CPU 220 signals the wake monitor 22 with engine control unit wake-up 29 to wake up the engine control unit 30 using engine wake 26 signal. The image processor unit 20 may transfer additional information on what sub-systems the engine control unit 30 controls should wake using the second communication interface 21.

Figure 3:
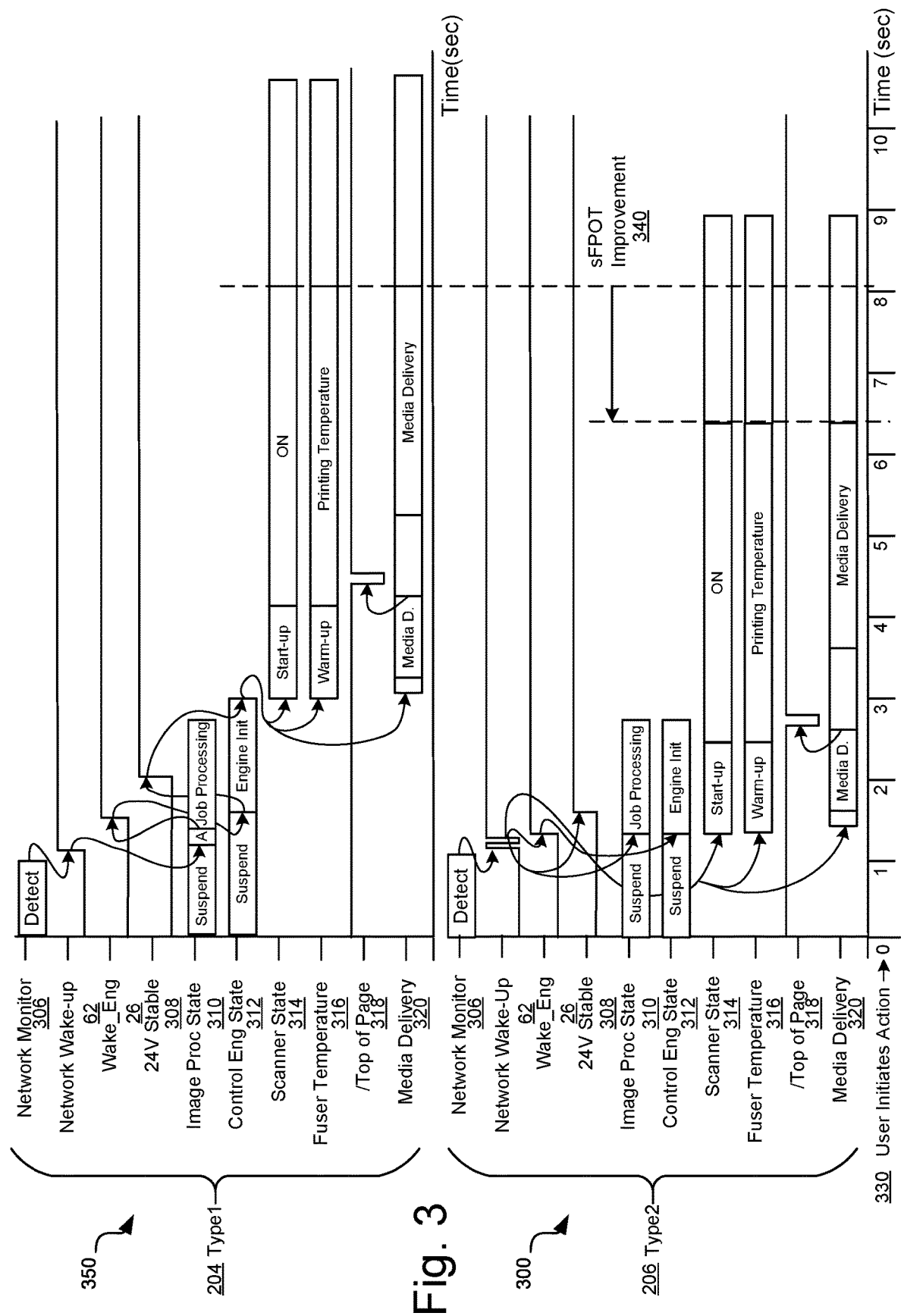
FIG. 3 is a set of two timing diagrams illustrating the parallel/serial operational sequencing depending on the type of network packet received.

FIG. 3 is a set of two example timing diagrams, the top for a modulation type 1 206 and the bottom for a modulation type 2 204. These timing diagrams illustrate the parallel (bottom)/serial (top) operational sequencing depending on the type of user initiated action 330. In this example, the user initiated action 330 is to send a set of network packets for printing a print job at a printer 10. The horizontal axis shows an estimated time for the operations to occur, although the actual times may be shorter or longer depending the specific printer implementations.

In this example, let the type 1 204 modulation be for a network command to scan documents when placed in the scanner 210 and print them out on the printer 10, or a copy operation. This action is predetermined to be performed as a serial operation as the printer 10 will need to wait until the user arrives and loads the document to be copied into the scanner 210, and enters a PIN to start the copy job. Let the type 2 206 modulation be for a network command to scan a document already in the scanner 210 and print it out on the printer 10. In the type 1 204 situation, power savings is desired as the time for the user to arrive is unknown. In the type 2 206 situation, the document is already at the printer and no user involvement is further needed. Thus, in this situation performance, such as a low sFPOT time, is desired.

For the type 1 204 situation, the network unit 60 monitors the network traffic as shown at network monitor 306 to detect a network packet. Once received, the network unit 60 signals with network wake-up 62 using a first type of modulation, type 1 204 the image wake monitor 22. On detecting that the modulation is type 1, the image processor unit 20 is awaken from a suspend or deep suspend state. The image processor unit 20 begins its job processing as shown in image proc state 310 on the diagram by first analyzing ("A") the detected network packet. Assuming in a best-case scenario in that the user has the media already loaded and enters the PIN as soon as possible after initiating the operation, the image processor unit 20 detects the PIN input and determines that the control engine unit 30 should be awaken. The image processor unit 20 then signals the image wake monitor 22 to awaken the engine control unit 30 using the wake engine signal 26 by using the control engine wake signal 29 along with powering on of the +24V supply as shown by 24V stable 308. Because this is a serial operation, as shown by control eng state 312 in the timing diagram, the control engine unit 30 is awaken from suspend or deep suspend from wake engine signal 26 and completes its initialization. Then image processor unit 20 begins powering the scanner 210 and control engine unit 30 powers the print engine 254 and the media delivery system of media input unit 252 and media output unit 256. Various sub-units within the image sub-system 40 and engine sub-system 50 are started together as indicated by the scanner state 314, fuser temperature 316 (for the print engine 254), and the media delivery state 320.

The scanner 210 takes a short time to start up and then is operational for scanning as shown in scanner state 314. The fuser of the print engine 254 needs to warm-up before printing can occur as shown by fuser temperature 316. The media input unit 252 of the media delivery system is started and begins to load the media into the print engine 254. Once a/Top of Page 318 signal is present, indicating the media is ready at the print engine 254, and the fuser temperature is at printing temperature and the scanner is ready, then the document may be scanned and the document copied to the media output unit 256 of the media delivery system. In one empirical example, the time for the first copied page of the document to exit the printer is at a first time of about 8 seconds as shown in FIG. 3.

For the type 2 206 modulation situation, the network unit 60 monitors the network traffic as shown at network monitor 306. The network unit 60 signals with network wake-up 62 using a second type of modulation, type 2 206 the image wake monitor 22. On detecting that the modulation is type 2 206, the image processor unit 20 is awaken from a suspend or deep suspend state along with powering on of the +24V supply as shown by 24V stable 308. Also, at the same time the image wake monitor 22 signals with wake engine 26 for the control engine unit 30 to awaken and begin its initialization. The image processor unit 20 begins its job processing as shown in image proc state 310 on the lower timing chart. As type 2 206 is a parallel wake operation in this example, the image processor unit 20 then awakens image scanner 210 and signals the control engine unit 30 using second communication interface 21 to awaken the print engine 254 and the media delivery system of media input unit 252 and media output unit 256. Accordingly, while the control unit 30 is still initializing it is already powering on the fuser in the control engine 254 and the media delivery system. Thus, the image scanner 210, the print engine 254, and the media delivery system of media input unit 252 and media output unit 256 are started together with the image processor unit 20 and engine control unit 30 as indicated by the scanner state 314, fuser temperature 316 (for the print engine 254), and the media delivery state 320.

The scanner 210 may take a short time to start up and then is operational for scanning as shown in scanner state 314. The fuser of the print engine 254 needs to warm-up before printing can occur as shown by fuser temperature 316. The media input unit 252 of the media delivery system is started and begins to load the media into the print engine 254. Once a/Top of Page 318 signal is present, and the fuser temperature is at printing temperature and the scanner is ready, then the document may be scanned and the document copied to the media output unit 256 of the media delivery system. In one empirical example, the time for the first copied page of the document to exit the printer is at a second time of about 6.4 seconds in for the type 2 206 parallel operational sequencing and thus has an at least 1.5 seconds faster sFPOT (resume from suspend first page out time) improvement 340 than with the type 1 204 serial operational sequencing. This sFPOT improvement now corresponds to a time for a resume from suspend first page out time being reduced substantially to that of a first page out time (FPOT) when the printer is not in a sleep state, substantially being less than about ¼ of a second (250 ms).

FIG. 4A is a chart 400 illustrating example analog stair-step modulations used to communicate a type of user initiated action. The horizontal axis represents time in a period 'T', typically in milliseconds (ms). The vertical axis is the level of the wake-up signal which is some examples may be 5V max and in other examples 3.3V max, though any max voltage could be used. Shown are four different types of analog modulation signals that can be used to convey the parallel or serial wake-up sequence desired. The four types of signals are separated in time to more clearly illustrate their differences. In this example, the type 1 204 modulation is a single step from 0V to Max V or a single rising edge. The type 2 206 modulation has a first step and then a second step a period 'T' later. The first step is to Max V/2 and the second step is from Max V/2 to Max V. The type 3 208 signal has three stair steps, each rising by Max V/3 each 'T' period. The type 4 210 signal has four steps, each rising by Max V/4 each 'T' period. This signaling technique can be extended for the number of desired power on sequences from deep suspend or suspend as desired. The advantage of this signaling technique is that available I/O signals are rare in systems and thus a single I/O signal may be used to convey the intended wake-up operational sequencing. This signaling technique has an advantage in encoding and decoding as it can be done easily using D/A and A/D conversion circuits or sample and hold circuits with capacitors and transmission gates.

FIG. 4B is a chart 450 illustration of an alternative example digital pulse count modulations used to communicate a type of user initiated action. The different examples are again separated in time for clarity. In this example, three types are shown but the technique may be extended to have more. The type 1 204 modulation in this example has a single leading edge, the type 2 206 modulation has two leading edges, and the type 3 208 modulation has three leading edges all occurring within a period 'T' typically in millisecs. This modulation technique has the advantage of being able to easily encode on a single signal and decode easily by using the signal as an input into a counter or using the signal as an interrupt trigger and counting the number of leading edge transitions in a time interval.

The analog stair-step modulation may be based on 1 or more T period voltage steps and the digital pulse count modulation may be based on 1 or more T period duration pulses and a number of T period voltage steps or duration pulses communicates a packet-type from the network unit 60. Although two types of modulation examples have been shown in FIGS. 4A and 4B, other types of modulations may be used including pulse width modulation and uni-directional or bi-directional serial command modulation, several of which are known to those of skill in the art.

Figure 5A:
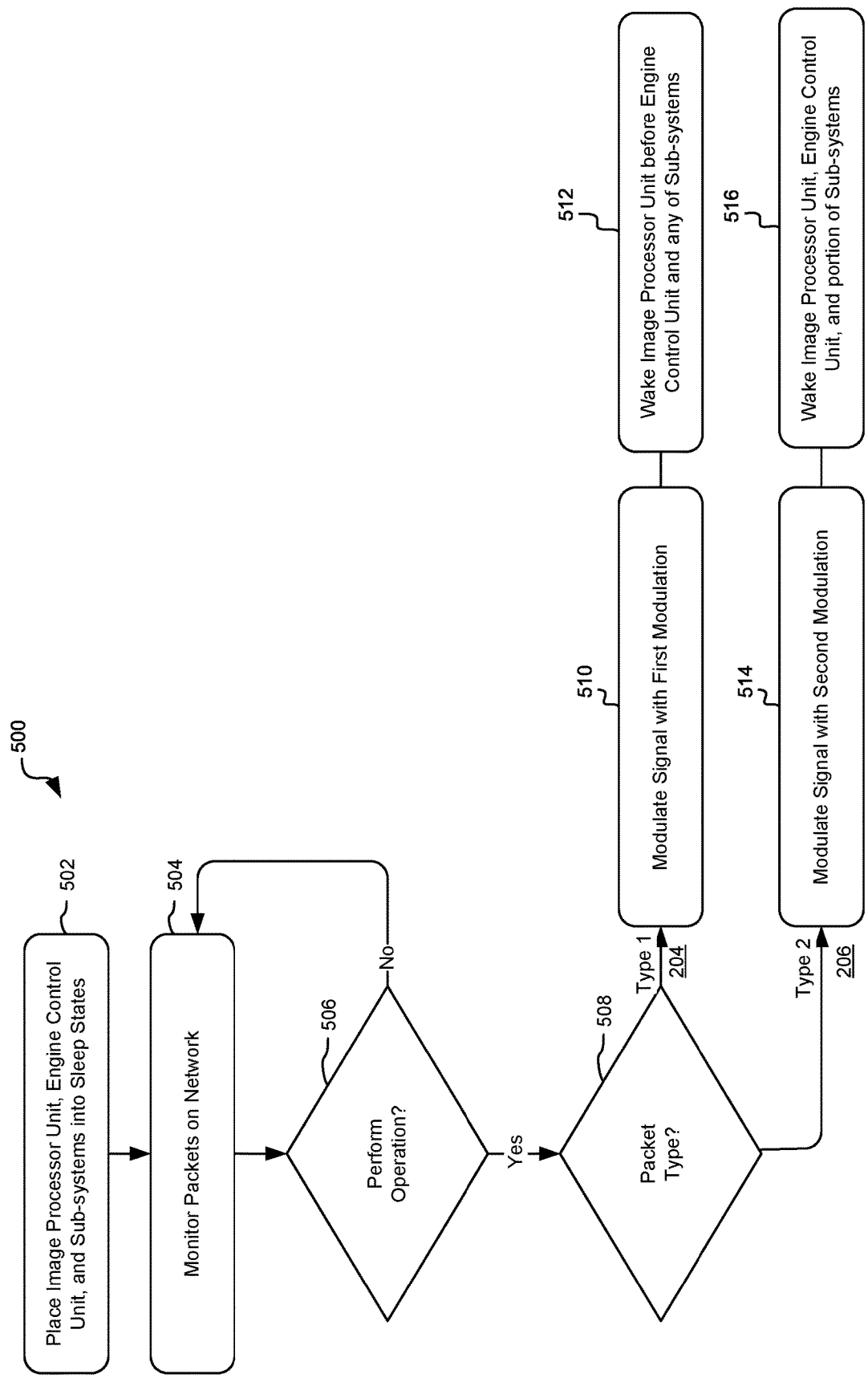
FIG. 5A is a flowchart illustrating an example method for carrying out parallel/serial operational sequencing.

FIG. 5A is a flowchart 500 illustrating an example method for carrying out parallel/serial operational sequencing. In block 502, an image processor unit 20, an engine control unit 30 and various sub-systems 40, 50 are placed into sleep or suspend states. In block 504, packets are monitored on a network to look for specially filtered or "magic packets" designated for the printer 10. In decision block 506, the packets are examined to determine if an operation is to be performed by the printer 10. If not, flow continues back to block 504 to continue monitoring the network. If in decision block 506 an operation is to be performed by the printer 10, then in decision block 508, the type of network packet is examined to determine the type of operational sequencing to be performed and whether a parallel or serial operation is to be performed. While there may be many types, in this example if a type 1 204 packet type is found, then in block 510, a wake-up signal is modulated with a first modulation and in block 512, the image processor unit 20 is awaken before the engine control unit 30 and any of the sub-systems 40, 50. If instead a type 2 206 packet is found then in block 514 the wake-up signal is modulated with a second modulation and in block 516, the image processor unit 20, the engine control unit 30, and a portion of the sub-systems 40, 50 are awaken at substantially the same time. Substantially being less than about 100 ms, although in some examples may be less than about 10 ms.

Figure 5B:
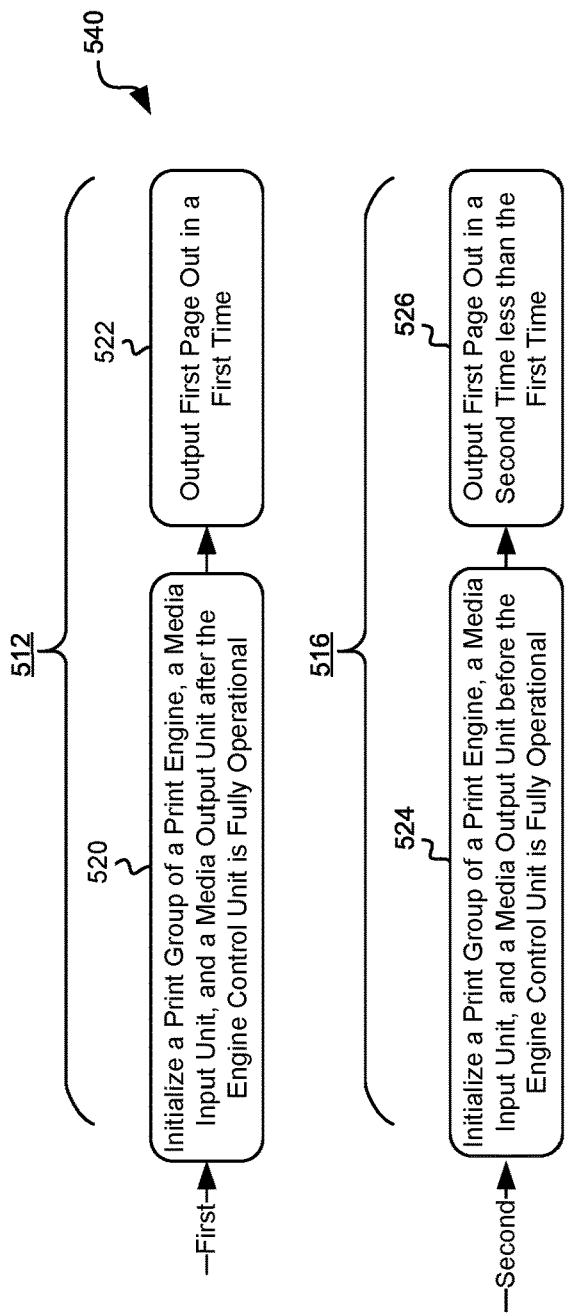
FIG. 5B is a flowchart illustrating additional steps which can be used in an example parallel/serial operational sequencing to reduce resume from suspend "first page out time"

FIG. 5B is a flowchart 540 illustrating additional steps which can be used in an example parallel/serial operational sequencing to reduce resume from suspend "first page out time" (sFPOT). Blocks 520 and 522 are an example implementation of block 512 of FIG. 5A. In block 520 a first modulation is received which causes the printer 10 to initiate a print group 54 that includes a print engine 254, a media input unit 252, and a media out unit 256 after the engine control unit 30 is fully operational. In block 522, the printer 10 outputs a first page out of the media output unit 256 in a first time. Blocks 540 and 526 are an example implementation of block 516 of FIG. 5A. In block 524, a print group 54 that includes a media input unit 252, a print engine 254, and a media output unit 256 are initialized before the engine control unit 30 is fully operational. In block 526, the printer 10 outputs a first page out of the media output unit 256 in a second time that is less than the first time, thereby reducing the resume from suspend first page out time (sFPOT).

Figure 5C:
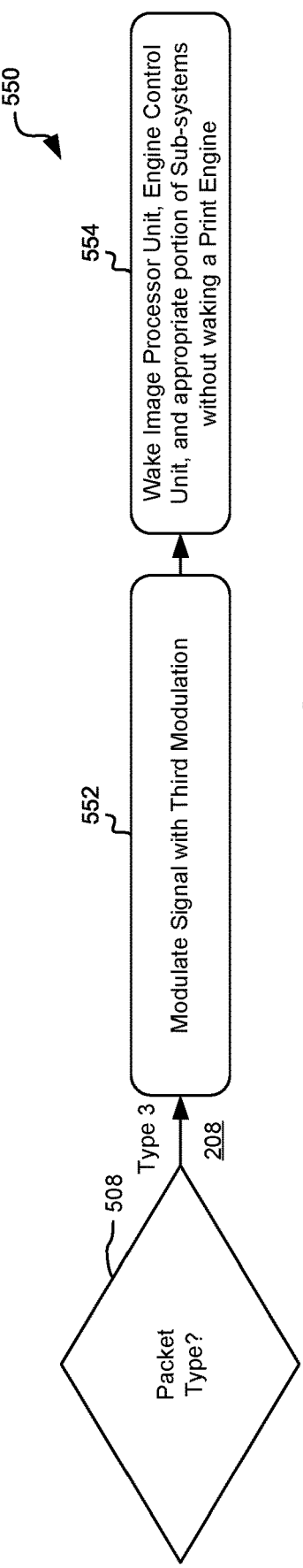
FIG. 5C is a flowchart illustrating additional steps which can be used to expand the parallel/serial operational sequencing beyond just printing.

FIG. 5C is a flowchart 550 illustrating additional steps which can be used to expand the parallel/serial operational sequencing beyond just printing. For instance, decision block 508 from FIG. 5A can be expanded to include filtering for more types of packets. In this example, a third type 3 packet has been detected and in block 552, network-wake-up signal 62 is modulated with a third modulation which is detected by the image wake monitor 22. In block 554, the image wake monitor 22 wakes the image processor unit 20, the engine control unit 30, and appropriate portions of the sub-systems 40, 50, as predeterminedly defined for a type 3 packet, without waking a print engine 254. By not waking the print engine 254, the printer 10 can respond to network traffic without delays and timeouts while still being able to conserve power.

The various examples described within may include logic or a number of components, modules, or constituents within one or more hardware and/or software units. Units may constitute either software modules, such as code embedded in tangible non-transitory computer readable medium 222, 232, 203, 263 and others within ASIC 234 and engine wake monitor 32) or hardware modules. A hardware module is a tangible unit capable of performing certain operations and by be configured or arranged in certain manners. In one example, one or more printers 10 or one or more hardware modules of a printer 10 may be configured by software (e.g. an application, or portion of an application) as a hardware module that operates to perform certain operations as described herein.

In some examples, a hardware module may be implemented as an electronically programmable unit. For instance, a hardware module may include dedicated circuitry or logic that is permanently configured (e.g. as a special-purpose processor, state machine, a field programmable gate array (FPGA) or an application specific integrated circuit (ASIC) to perform certain operations. A hardware module may also include programmable logic or circuitry (e.g. as encompassed within a general-purpose processor or other programmable processor) that is temporarily configured by software to perform certain operations. It will be appreciated that the decision to implement a hardware module electronically in dedicated and permanently configured circuitry, or in temporarily configure circuitry (e.g. configured by software) may be driven by cost and time considerations.

Any computer readable mediums (CRM) 262, 222, 203, 232 allow for the storage of one or more sets of data structures and instructions (e.g. software, firmware, logic) embodying or utilized by any one or more of the methodologies or functions described herein. The instructions may also reside, completely or at least partially, with the static memory, the main memory, and/or within a processor during execution by the printer 10. The processor main memory and the processor cache and register memory also constitute computer readable medium. The term "computer readable medium" may include single medium or multiple media (centralized or distributed) that store the one or more instructions or data structures. The computer readable medium may be implemented to include, but not limited to, solid state, optical, and magnetic media whether volatile or non-volatile. Such examples include, semiconductor memory devices (e.g. Erasable Programmable Read-Only Memory (EPROM), Electrically Erasable Programmable Read-only Memory (EEPROM), and flash memory devices), magnetic discs such as internal hard drives and removable disks, magneto-optical disks, and CD-ROM (Compact Disc Read-Only Memory) and DVD (Digital Versatile Disc) disks.

While the claimed subject matter has been particularly shown and described with reference to the foregoing examples, those skilled in the art will understand that many variations may be made therein without departing from the intended scope of subject matter in the following claims. This description should be understood to include all novel and non-obvious combinations of elements described herein, and claims may be presented in this or a later application to any novel and non-obvious combination of these elements. The foregoing examples are illustrative, and no single feature or element is to be used in all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A printing device comprising:
   engine control circuitry coupled to mechanical and print circuitry;
   image processor circuitry coupled to the engine control circuitry and to imaging circuitry; and
   network circuitry coupled to the image processor circuitry to monitor network packets while the engine control circuitry, the mechanical and print circuitry, the imaging circuitry, and the image processor circuitry are each in a sleep state,
   wherein when a packet of a first type is received, the network circuitry signals with a first modulation signal to wake the image processor circuitry first, then wake the engine control circuitry, and finally wake the mechanical and print circuitry after the engine control circuitry is fully operational, in a serial mode,
   and wherein when a packet of a second type is received, the network circuitry signals with a second modulation signal to wake the image processor circuitry, the engine control circuitry, and the mechanical and print circuitry at a same time, in a parallel mode.

2. The printing device of claim 1, wherein the mechanical and print circuitry has a first page out time when the first modulation signal is used, the mechanical and print circuitry has a different first page out time when the second modulation signal is used, and the different first page out time is less than the first page out time.

3. The printing device of claim 1, wherein the mechanical and print circuitry include print engine circuitry,
   and wherein when a packet of a third type is received, the network circuitry signals with a third modulation signal to wake the image processor circuitry, the engine control circuitry, and the mechanical and print circuitry at a same time without waking the print engine circuitry.

4. The printing device of claim 1, wherein the first modulation signal is an analog stair-step modulation signal, a pulse-width modulation signal, a digital pulse count modulation signal, or a uni-directional or bi-directional serial command modulation signal.

5. The printing device of claim 4, wherein the analog stair-step modulation signal is based on one or more T period voltage steps, and the digital pulse count modulation signal is based on one or more T period duration pulses.

6. The printing device of claim 1, wherein the engine control circuitry and the image processor circuitry can wake one another from a sleep state to an operational state.

7. A method comprising:
placing image processor circuitry, engine control circuitry, mechanical and print circuitry, and imaging circuitry of a printing device into a sleep state, the image processor circuitry coupled to the engine control circuitry and to the imaging circuitry, the engine control circuitry coupled to the mechanical and print circuitry;
monitoring packets on a network with network circuitry; and
modulating a signal by the network circuitry based on a type of packet received,
wherein when a first type of packet is received, the signal is modulated with a first modulation to wake the image processor circuitry first, then wake the engine control circuitry, and finally wake the mechanical and print circuitry after the engine control circuitry is fully operational, in a serial mode,
and wherein when a second type of packet is received, the signal is modulated with a second modulation to wake the image processor circuitry, the engine control circuitry, and the mechanical and print circuitry at a same time, in a parallel mode.

8. The method of claim 7, wherein the mechanical and print circuitry has a first page out time when the first modulation is used, the mechanical and print circuitry has a different first page out time when the second modulation is used, and the different first page out time is less than the first page out time.

9. The method of claim 7, wherein the mechanical and print circuitry include print engine circuitry,
and wherein when a third type of packet is received, the signal is modulated with a third modulation to wake the image processor circuitry, the engine control circuitry, and the mechanical and print circuitry at a same time without waking the print engine circuitry.

10. The method of claim 7, wherein modulating the signal includes modulating the signal via analog stair-step modulation, pulse-width modulation, a-digital pulse count modulation, or uni-directional or bi-directional serial command modulation.

11. The method of claim 10, wherein the analog stair-step modulation is based on one or more T period voltage steps, and the digital pulse count modulation is based on one or more T period duration pulses.

12. The method of claim 7 wherein the engine control circuitry and the image processor circuitry can wake one another from a sleep state to an operational state.

* * * * *